Figure 1:
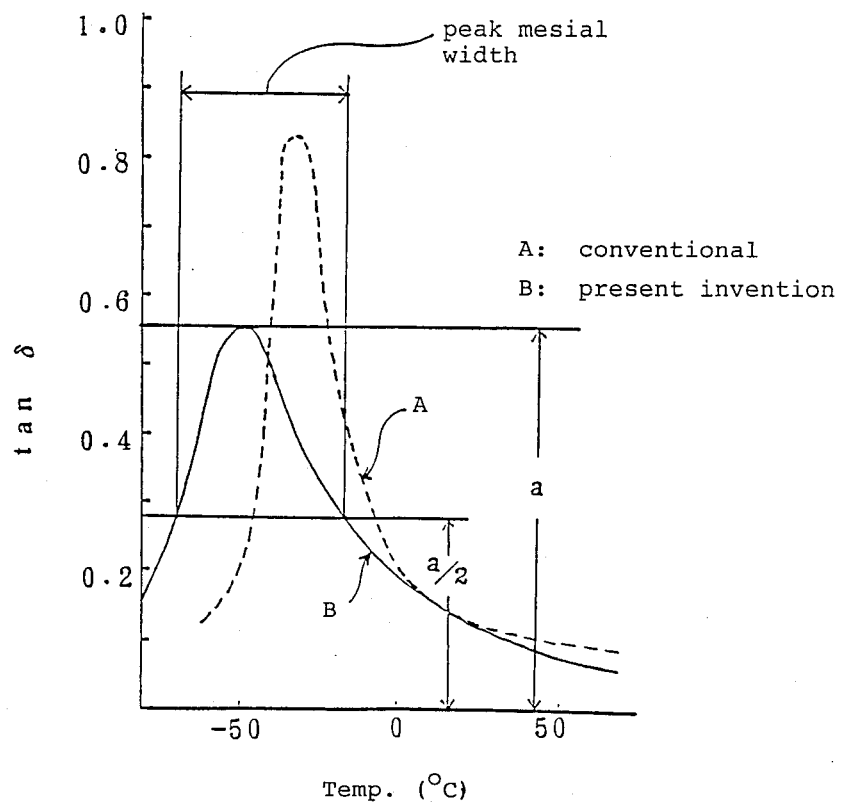

United States Patent [19]

Ida et al.

[11] Patent Number: 4,745,150

[45] Date of Patent: May 17, 1988

[54] RUBBER COMPOSITION FOR TIRE TREADS

[75] Inventors: Eiji Ida, Takatsuki; Riichiro Ohara, Suita, both of Japan

[73] Assignee: Toyo Tire & Rubber Company Limited, Osaka, Japan

[21] Appl. No.: 941,325

[22] Filed: Dec. 15, 1986

[30] Foreign Application Priority Data

Dec. 17, 1985 [JP] Japan ................. 60-284960

[51] Int. Cl.$^4$ ................. C08K 3/04; C08L 51/02
[52] U.S. Cl. ................. 524/505; 524/572; 524/575; 525/95; 525/99
[58] Field of Search ............... 524/496, 505, 572, 575; 525/196, 95, 99

[56] References Cited

U.S. PATENT DOCUMENTS

| | | | |
|---|---|---|---|
| 4,071,496 | 1/1978 | Kraus et al. | 524/496 |
| 4,111,867 | 9/1978 | Komuro et al. | 524/496 |
| 4,383,085 | 5/1983 | Fujimaki et al. | 525/196 |
| 4,398,582 | 8/1983 | Yuto et al. | 524/496 |
| 4,433,094 | 2/1984 | Ogawa et al. | 524/496 |

FOREIGN PATENT DOCUMENTS

| | | | |
|---|---|---|---|
| 3220680 | 1/1983 | Fed. Rep. of Germany | 525/196 |
| 58-225141 | 12/1983 | Japan | 525/196 |

Primary Examiner—Allan M. Lieberman
Attorney, Agent, or Firm—Murray and Whisenhunt

[57] ABSTRACT

A tire tread rubber composition exhibiting outstanding dynamic behavior and characterized in that the composition comprises as a rubber component at least 30 wt. % of an elastic styrene-butadiene copolymer prepared by solution polymerization with use of a lithium-base catalyst, the copolymer being higher than $-60°$ C. in glass transition temperature (T g) and at least 40° C. in the peak mesial width of tan $\delta$ determined from the temperature range between the two points of intersection of the curve of tan $\delta$ with the line of tan $\delta = \frac{1}{2}a$ wherein a is the peak value of tan $\delta$ determined from a temperature—tan $\delta$ dispersion curve.

3 Claims, 1 Drawing Sheet

RUBBER COMPOSITION FOR TIRE TREADS

The present invention relates to a rubber composition suitable for tire treads.

It is known to use polymers having a high glass transition temperature (Tg) for giving tires of improved dynamic behavior in respect of dry skid and wet skid characteristics. However, polymers having a high Tg generate a large quantity of heat and therefore exhibit impaired high-speed durability although affording improved traction.

An object of the invention is to provide a rubber composition for tire treads which has improved traction and enhanced high-speed durability in good balance.

The above and other objects of the invention will become apparent from the following description.

The present invention provides a tire tread rubber composition exhibiting outstanding dynamic behavior and characterized in that the composition comprises as a rubber component at least 30 wt.% of an elastic styrene-butadiene copolymer prepared by solution polymerization with use of a lithium-base catalyst, the copolymer being higher than −60° C. in glass transition temperature (Tg) and at least 40° C. in the peak mesial width of tan δ determined from the temperature range between the two points of intersection of the curve of tan δ with the line of tan δ = ½a wherein a is the peak value of tan δ determined from a temperature−tan δ dispersion curve.

According to the present invention, it is required that 100 parts (by weight, the same as hereinafter) of the rubber component of the composition contain at least 30 parts, preferably 50 to 100 parts, of the above-specified solution-polymerized styrene-butadiene copolymer (SBR). If the amount of the copolymer is smaller, the composition fails to afford a tread which is outstanding in various characteristics. Dynamic behavior (traction) and high-speed durability are in conflict with each other. Although various blends of at least two rubbers and different kinds of carbons have heretofore been used in varying quantities to meet these two requirements, satisfactory results still remain to be achieved.

Whereas chlorinated butyl rubber (Cl-IIR) is available which is higher than −60° C. in Tg and at least 40° C. in the above-mentioned mesial width, this rubber is inferior in covulcanizability with diene polymers, such that the tread, when incorporating a large amount of the rubber, exhibits poor adhesion to the belt skim rubber and causes separation from the belt skim rubber during running. The rubber therefore leads immediate tire failure and is difficult to use.

We have made intensive efforts to solve the above problem and found that use of a solution-polymerized SBR having a mesial width of at least 40° C. assures good balance between traction and high-speed durability and that the SBR, when higher than −60° C. in Tg, affords the traction required of the tire treads which exhibit excellent dynamic behavior.

Further according to the invention, the use of the solution-polymerized SBR also assures good adhesion. The solution-polymerized SBR having the foregoing characteristics and to be used in the invention is, for example, an elastic block copolymer prepared by solution polymerization with use of a lithium-base catalyst and comprising one unit of butadiene rubber (BR) block and one unit of random-copolymerized SBR block, the BR block having a vinyl content of 40 to 90%, the SBR block having a vinyl content of 50 to 90% and a styrene content of 30 to 70%, the block copolymer having in its entirety a vinyl content of 50 to 80% and a styrene content of 5 to 30%, at least 40% of the copolymer being coupled with a tin compound so that the coupled copolymer has a BR terminal, the coupled copolymer being higher than −60° C. in Tg and at least 40° C. in the peak mesial width of tan δ determined from the temperature range between the two points of intersection of the curve of tan δ−temperature with lines of half of peak of tan δ. Also useful is SBR prepared by other process and having other micro structure. The lithium-base catalyst is, for example, butyllithium. The peak mesial width of tan δ is determined from the temperature range between the two points of intersection of the line of tan δ = ½a with the curve of tan δ wherein a is the peak value of tan δ determined from the temperature−tan δ dispersion curve shown in FIG. 1.

For the above elastic block copolymer to be suitable, the BR block has a vinyl content of 40 to 90%, the SBR block has a vinyl content of 50 to 90% and a styrene content of 30 to 70%, and the copolymer has a vinyl content of 50 to 80% and a styrene content of 5 to 30% in its entirety. If these contents are less than the lower limits, poor traction will result, whereas contents exceeding the upper limits entail impaired high-speed durability.

The copolymer is coupled with a tin compound so that the copolymer as coupled has a BR block at the terminal. Examples of preferred tin compounds are halides, such as fluorides, chlorides, bromides and iodides, of Sn(II) and Sn(IV). The coupling efficiency is at least 40%, preferably 40 to 100%, more preferably 45 to 95%, most preferably 50 to 70%. When the efficiency is at least 40%, improved high-speed durability is available without impairing the dynamic behavior. The coupling efficiency was determined using gel permeation chromatography (GPC), product of Waters, and 0.5 g/100 ml solution of the copolymer in tetrahydrofuran to prepare a molecular weight distribution graph, in which two peaks appeared, one for the coupled high-molecular-weight portion and the other for the unreacted low-molecular-weight portion. The efficiency was calculated from the ratio of the area of the former peak to the entire area. The Tg of the coupled copolymer was measured according to ASTM D3418 using a differential scanning calorimeter (DSC), product of Rigaku Denki Co., Ltd. The above Tg is required to be higher than −60° C. When the TG is lower than −60° C., impaired dynamic behavior (traction) will result although satisfactory high-speed durability is available.

According to the present invention, at least one of natural rubber (NR) and synthetic rubbers may be used as an ingredient of the rubber component other than the specified SBR. Examples of useful synthetic rubbers are polyisoprene rubber (IR), polybutadiene rubber (BR), conventional styrene-butadiene rubber (SBR), modified products of these rubbers, blends of such rubbers, etc.

According to the present invention, it is desirable to use 60 to 150 parts, preferably 70 to 120 parts, of carbon black per 100 parts of the rubber component.

The rubber composition of the present invention is prepared by mixing the foregoing components together by usual means such as rolls, Banbury mixer or kneader. It is of course possible to incorporate into the composition other known additives such as sulfur, vulcanization accelerator, activator, retarder, carbon black, filler, antioxidant, tackifier, etc.

The present invention will be described in greater detail with reference to the following examples and comparative examples, wherein the parts are by weight.

The loss factor tan δ was measured at a rate of rise of temperature of 2° C./min and a frequency of 100 Hz using a spectrometer, product of Iwamoto Seisakusho Co., Ltd.

The tires were tested for skid resistance (wet $\mu$) and drum high-speed endurance according to the methods of Uniform Tire Quality Grading (UTQG), 575,104, one of the consumers' information regulation of the U.S. The tires were also tested for dry $\mu$ on an asphalt pavement by substantially the same method as the wet $\mu$ test method of UTQG. The high-speed endurance is carried out on wheel tester and the result is expressed in terms of the tire speed when a failure occurred and the time taken for the occurrence of the failure at the speed measured.

FIG. 1 is a graph showing how to determine the peak mesial width of tan δ.

EXAMPLES 1 AND 2, AND COMPARATIVE EXAMPLES 1 TO 5

To 100 parts of the rubber component (coupling agent: SnCl₄) listed in Table 1 were added 90 parts of carbon black (a), 40 parts of oil, 3 parts of zinc oxide, 2 parts of stearic acid, 3 parts of an antioxidant (of the p-phenylenediamine type), 1.5 parts of a vulcanization accelerator (sulfen amide type) and 2 parts of sulfur. The raw material was mixed into a rubber composition by a Banbury mixer. Table 1 also shows the properties of the compositions thus prepared, and the characteristics of the tires produced using the compositions.

The rubber composition of Comparative Example 5 listed in Table 1 is a control which was prepared from SBR 1502 (Product of Japan Synthetic Rubber Co., Ltd.) which is a kind of emulsion-polymerized SBR (E-SBR).

The carbon black (a) is 118 in the specific surface area (N₂SA) determined by the nitrogen adsorption method, 120 in iodine adsorption number (IA), 113 in the specific surface area (CTAB) determined by the cetyltrimethylammonium bromide adsorption method, 99 in dibutyl phthalate oil absorption number (24M₄.DBP) and 115 in tint strength.

In Table 1, A to C are solution-polymerized styrene-butadiene block copolymer, D to E are random S-SBR, F is Cl-IIR and G is SBR 1502 (E-SBR).

SBR block, is as low as −70° C. in the Tg of the copolymer and is therefore lower in wet $\mu$ and dry $\mu$ than the control. Comparative Example 2 is great in the styrene content of the copolymer and small in tan δ peak mesial width, so that the composition has yet to be improved in wet $\mu$ and dry $\mu$. Comparative Example 3 is great in the styrene content of the copolymer, small in tan δ peak mesial width and considerably high in Tg, consequently permitting great heat generation and resulting in low durability. Comparative Example 4, in which Cl-IIR is used, is poor in adhesion, permits separation in the shoulder portion at early stage and is therefore low in durability.

EXAMPLES 3 TO 5 AND COMPARATIVE EXAMPLE 6

Rubber compositions were prepared in the same manner as in Example 1 with the exception of using the rubber components listed in Table 2. The tires prepared using the compositions were similarly tested for characteristics.

TABLE 2

|  | Example | | | Com. Ex. |
|---|---|---|---|---|
|  | 3 | 4 | 5 | 6 |
| polymer A | 35 | 50 | 70 | 20 |
| E-SBR (1) (SBR 1502) |  |  | 30 | 40 |
| E-SBR (2) (SBR 0120) | 50 | 35 |  | 40 |
| Br (BR 150B) | 15 |  |  |  |
| NR |  | 15 |  |  |
| tire wet $\mu$ | 105 | 108 | 110 | 103 |
| tire dry $\mu$ | 106 | 108 | 109 | 104 |
| drum high-speed km/hr | 200 | 200 | 200 | 192 |
| durability min | 20 | 24 | 20 | 25 |

Table 2 shows that the composition of Comparative Example 6 in which less than 30 wt.% of polymer A is present still remains to be improved in wet $\mu$ and dry $\mu$ and is also low in durability.

We claim:
1. A tire tread rubber composition exhibiting outstanding dynamic behavior, said rubber composition comprising:
   a rubber component; and
   60–150 parts of carbon black per 100 parts of said rubber component;
   wherein said rubber component comprises:
   30 to 100 wt % of an elastic styrene-butadiene copolymer prepared by solution polymerization with

TABLE 1

|  | Ex. | | Com. Ex. | | | | |
|---|---|---|---|---|---|---|---|
|  | 1 | 2 | 1 | 2 | 3 | 4 | 5 |
|  | | | polymer No. | | | | |
|  | A | B | C | D | E | F | G |
| vinyl content in BR (%) | 75 | 64 | 47 |  |  |  |  |
| vinyl content in SBR (%) | 75 | 70 | 80 |  |  |  |  |
| styrene content in SBR (%) | 43 | 45 | 17 |  |  |  |  |
| vinyl content in copolymer (%) | 74 | 66 | 57 | 56 | 68 | — | 19 |
| styrene content in copolymer (%) | 13 | 13 | 6 | 40 | 47 | — | 23.5 |
| coupling efficiency (%) | 52 | 53 | 52 | 51 | 48 | — | — |
| Tg of copolymer (°C.) | −48 | −55 | −70 | −23 | −3 | −37 | −57 |
| tan δ peak mesial width | 49 | 58 | 42 | 29 | 32 | 65 | 32 |
| tire wet $\mu$ | 112 | 110 | 95 | 104 | 110 | 111 | 100 |
| tire dry $\mu$ | 109 | 107 | 93 | 103 | 112 | 109 | 100 |
| drum high-speed km/hr | 200 | 200 | 200 | 200 | 192 | 144 | 200 |
| durability min | 17 | 19 | 28 | 7 | 12 | 9 | 16 |

Table 1 reveals that the compositions of Examples 1 and 2 are superior to the control in respect of any of wet $\mu$, dry $\mu$ and high-speed durability. The composition of Comparative Example 1 is low in the styrene content of use of a lithium-base catlyst, the copolymer being higher than −60° C. in glass transition temperature (Tg) and at least 40° C. in the peak mesial width of tan $\delta$ determined from the temperature range between the two points of intersection of the curve of tan $\delta$ with the line of tan $\delta = \frac{1}{2}a$ wherein a is the peak value of tan $\delta$ determined from a temperature—tan $\delta$ dispersion curve and tan $\delta$ is the loss factor measured at a rate of rise of temperature of 2° C./min and a frequency of 100 Hz, and 0 to 70 wt % of at least one rubber selected from the group of natural rubber and synthetic rubber.

2. A tire tread rubber composition as defined in claim 1, wherein said elastic styrene-butadiene copolymer is present in an amount of 50 to 100 wt % of said rubber component.

3. A tire tread rubber composition as defined in claim 1, wherein said elastic styrene-butadiene copolymer is a block copolyer comprising butadiene block and random copolymerized styrene and butadiene block wherein the butadiene block has a vinyl content of 40 to 90%, the random copolymerized styrene and butadiene block has a vinyl content of 50 to 90% and a styrene content of 30 to 70%, and the block copolymer has a vinyl content of 50 to 80% and a styrene content of 5 to 30% in its entirety, said elastic styrene-butadiene copolymer being coupled with a tin compound so that the elastic styrene-butadiene copolymer, as coupled, has a terminal butadiene block.

* * * * *